United States Patent [19]

Whiteside

[11] 4,008,481
[45] Feb. 15, 1977

[54] EXPOSURE CONTROL SYSTEM WITH SEPARATE FLASH AND AMBIENT TRIGGER LEVELS

[75] Inventor: George D. Whiteside, Lexington, Mass.

[73] Assignee: Polaroid Corporation, Cambridge, Mass.

[22] Filed: Oct. 3, 1975

[21] Appl. No.: 619,383

[52] U.S. Cl. .................................. 354/27; 354/32; 354/60 F; 354/139; 354/149

[51] Int. Cl.² .......................................... G03B 7/14

[58] Field of Search ................. 354/32, 33, 34, 35, 354/27, 38, 50, 51, 60 R, 60 F, 139, 149

[56] References Cited

UNITED STATES PATENTS

| | | | |
|---|---|---|---|
| 3,205,802 | 9/1965 | Wareham | 354/34 |
| 3,326,103 | 6/1967 | Topaz | 354/34 |
| 3,821,754 | 6/1974 | Nobusawa | 354/51 |
| 3,921,184 | 11/1975 | Borowski et al. | 354/32 |

Primary Examiner—Russell E. Adams, Jr.
Attorney, Agent, or Firm—Edward S. Roman

[57] ABSTRACT

An exposure control system is provided with means through which it is automatically actuated to change the exposure controlling characteristics thereof in response to the coupling of a source of artificial illumination therewith. The exposure control system is operable in both an ambient and flash mode of operation wherein the exposure control system anticipates a rather large shutter blade overshoot subsequent to the command signal to close the shutter blades during the ambient mode of operation which anticipation is automatically compensated for during the flash mode of operation to provide an optimum flash mode exposure interval prior to receipt of the command signal to close the shutter blade elements.

17 Claims, 9 Drawing Figures

EXPOSURE CONTROL SYSTEM WITH SEPARATE FLASH AND AMBIENT TRIGGER LEVELS

BACKGROUND OF THE INVENTION

1. Field of the Invention

This invention relates generally to means for altering the exposure characteristics of a photographic apparatus when used with artificial illumination and, more particularly, to an exposure control system which is automatically actuated to change the exposure characteristics thereof in response to the coupling of a source of artificial illumination therewith.

2. Description of the Prior Art

Automatic light responsive exposure control systems are well known in the photographic arts and have been long used to control the duration of a photographic exposure. Such exposure control systems are generally utilized to control a shutter blade assembly which is movable along a predetermined path between a first position precluding scene light from reaching a film plane and a second position defining a maximum size aperture. It is often desirable to alter the operating characteristics of an exposure control system when used in conjunction with a source of artificial illumination as is more fully disclosed in U.S. Pat. No. 3,200,723, entitled "Shutter Timing Apparatus" by J. M. Topaz, issued Aug. 17, 1965. The operating characteristics of the exposure control system of Topaz are changed during the flash mode operation to reduce exposure errors which would otherwise occur as a result of the exposure control system being calibrated to operate properly under ambient conditions when the scene illumination is of substantially constant intensity. Thus when the exposure duration is controlled by a light integrating control circuit, selectively operable means are provided to reduce the amount of light required to trigger the circuit to cause termination of the exposure thereby reducing or eliminating errors in the amount of light which is allowed to impinge upon the film where the scene is illuminated by photoflash apparatus.

More recently, some exposure control systems have incorporated what is termed a "follow focus" system where the aperture adjustment is mechanically coupled with the focusing system of the camera. Thus, as the lens focus system is moved to provide the correct focus for a particular distance from the camera to the subject, the coupling mechanism of the follow focus control system also moves to provide an appropriate exposure aperture opening in response to the focusing action, thereby setting the exposure aperture in accordance with the anticipated light level at the scene to be photographed. Because of the known characteristics of the flash lamp being used, the anticipated light level at the scene to be photographed is functionally related to the distance to the subject.

An automatic exposure control system which is responsive to both scene light by way of a light integrating control circuit and to subject distance by way of a follow focus setting is described in U.S. Pat. No. 3,464,332 issued to Davidson et al. on Sept. 2, 1969. In the exposure control system of the above-cited patent, the aperture opening for admitting light to the film plane is automatically selected in accordance with the focusing of the camera and the exposure time is then controlled by a light detecting and integrating unit so as to establish a unique interrelationship between the exposure aperture and the exposure time. In systems of this type, it is preferable to provide ambient mode control solely in response to scene lighting while artificial light control is provided in response to both scene lighting and subject distance. Thus, it is important to provide scene light responsiveness which is compatible for operation in both camera modes.

Apart from the obvious difficulties in reconciling ambient and flash exposure control resulting from differences between the uniform light intensity encountered during ambient mode operation and the varying light intensity encountered during flash mode operation, other difficulties arise as a result of the operational changes in the shutter assembly between ambient and flash operation. For instance, in a two-bladed shutter assembly of the scanning type, the command trigger signal from the light integrating control circuit to terminate the exposure interval is generally received while the shutter blade elements are moving in a direction of progressively increasing effective aperture size. Thus, the forward momentum of the shutter assembly must be overcome before the blades can start to return to their closed position. Hence, a considerable overshoot is experienced where the effective aperture defined by the shutter assembly primary apertures increases beyond its value at the time that the command trigger signal is received from the light integrating circuit. Such an overshoot in the effective aperture defined by the shutter blade elements may be easily anticipated in a well known manner by configuring the photocell sweep apertures to open ahead of the shutter blade primary apertures. However, in the flash mode of operation where a source of artificial illumination is utilized, the shutter blade elements generally reach their maximum effective aperture defining position as determined by the follow focus system prior to receipt of the command signal to terminate the exposure interval. Hence, the shutter blade elements are already at rest at the follow focus setting when the command signal to terminate the exposure interval is received and thus the shutter blade elements do not overshoot their aperture defining position at the time of receipt of the command signal. Hence, the built-in anticipation for the ambient mode of operation becomes incompatible with the flash mode of operation to provide an adequate film exposure.

Therefore, it is a primary object of this invention to provide a light responsive exposure control system for photographic apparatus which system is compatible for both ambient and flash modes of operation.

It is another object of this invention to provide a light responsive exposure control system for a photographic apparatus which system is automatically actuated upon the coupling of a source of artificial illumination with the camera apparatus to provide an optimum flash mode exposure interval different from the ambient mode exposure interval.

It is a further object of this invention to provide an exposure control system for a photographic apparatus of the type having a follow focus system wherein the flash mode exposure interval before the shutter blade elements are commanded to close is automatically increased in response to the coupling of a source of artificial illumination with the camera apparatus to compensate for the reduction in shutter blade overshoot during the flash mode of operation.

It is a still further object of this invention to provide an exposure control system for a photographic apparatus operable in both an ambient and flash mode of operation wherein the exposure interval before the shutter blade elements are commanded to close during the flash mode of operation is automatically increased in response to the coupling of a source of artificial illumination so as to provide a film exposure compatible with the blade dynamics during flash mode operation.

It is an even further object of this invention to provide an exposure control system for a photographic apparatus of the type operable in both an ambient and flash mode of operation wherein the exposure control system anticipates a rather large shutter blade overshoot during the ambient mode of operation which anticipation is automatically compensated for during the flash mode of operation where such a large blade overshoot is generally not encountered.

Other objects of the invention will in part be obvious and will in part appear hereinafter. The invention accordingly comprises the mechanism and system processing the construction, combination of elements and arrangement of parts which are exemplified in the following detailed disclosure.

SUMMARY OF THE INVENTION

This invention provides an exposure control system for a camera apparatus of the type including a housing and an objective lens mounted on the housing wherein the housing defines a film exposure plane. The control system comprises a blade assembly movable along a predetermined path between a first position wherein it precludes scene light from reaching the film plane and a second position wherein it defines a maximum size aperture. The blade assembly serves to define a range of progressively increasing size apertures as it moves from its first position toward its second position during a photographic exposure cycle. Means are also provided for moving the blade assembly along the predetermined path. The moving means may be selectively actuated to move the blade assembly from the first position along the predetermined path toward the second position at the commencement of the photographic exposure cycle. Light detecting and integrating means are provided to detect the scene light incident to the camera apparatus subsequent to the commencement of a photographic exposure cycle in order to provide an output signal condition corresponding to a time integration of the scene light. In addition, there are provided means responsive to a select change in the value of the output signal condition of the integrating means after the commencement of the photographic exposure cycle for actuating the moving means to move the blade assembly back along the predetermined path toward the fist position.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment when read in connection with the accompanying drawings, where like members have been employed in the different figures to note the same parts and wherein:

DESCRIPTION OF THE PREFERRED EMBODIMENT

Figure 1:
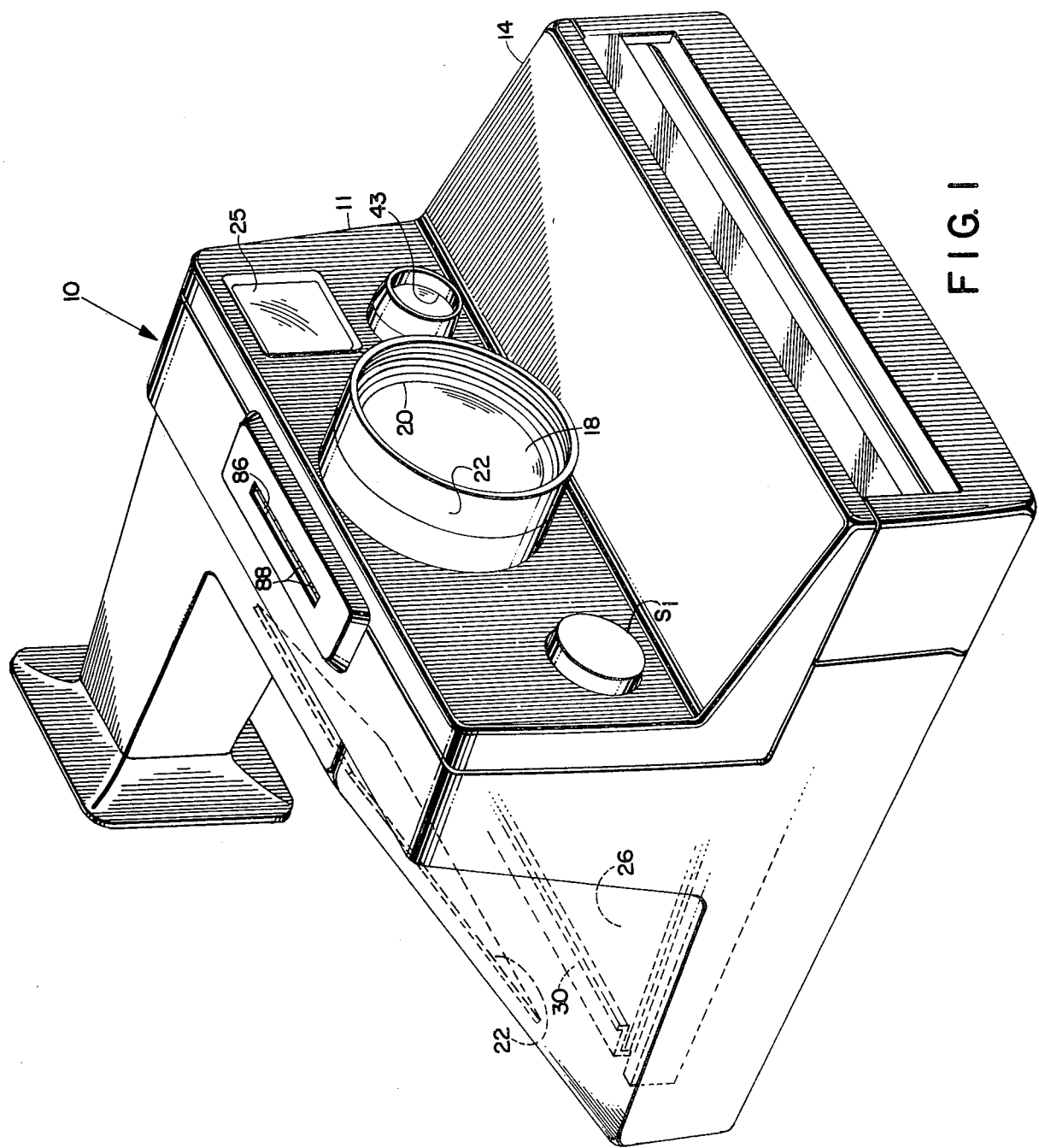
FIG. 1 is a perspective view of a photographic camera embodying the exposure control system of this invention.
Figure 2:
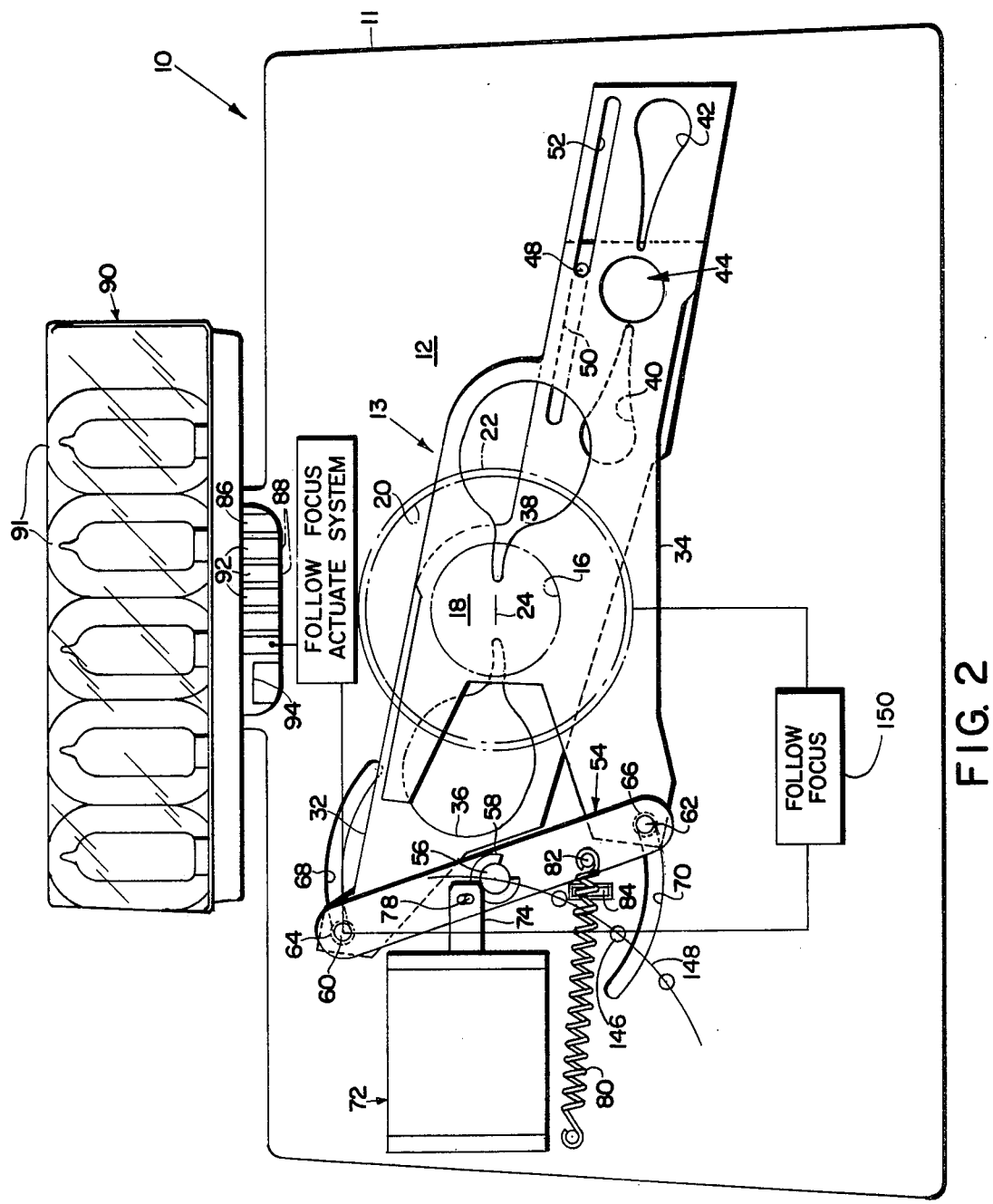
FIG. 2 is a front cross-sectional view of the camera of FIG. 1 showing a portion of the exposure control mechanism.

Referring now to FIGS. 1 and 2, it can be seen that the exposure control system of this invention is associated with a photographic camera apparatus 10 contained within a housing 11. A baseblock casting 12 is fixedly stationed within the housing 11 and selectively machined to support of the exposure mechanism. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the housing 11 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plane 26 by way of a reflecting mirror 28 all of which are stationed within a suitable light tight film exposure chamber 30 within the housing 11.

Intermediate the objective lens 18 and light entering exposure opening 16, there are supported two overlapping shutter blade elements 32 and 34 which will be subsequently described in greater detail herein. Extending from the front cover 14 there is provided a photographic exposure cycle initiating button $S_1$, the depression of which commences the exposure cycle by releasing the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation from effective aperture openings in accordance with simultaneous longitudinal and lateral displacement of one blade element with respect to the other blade element in a manner as is fully described in U.S. patent application Ser. No. 585,128 entitled "Camera With Pivoting Blades" by George D. Whiteside, filed July 2, 1974, and assigned in common herewith. The apertures 36 and 38 are selectively shaped so as to overlap the light entering exposure opening 16 thereby defining a gradually varying effective aperture size as a function of the position of blade elements 32 and 34.

Figure 3:
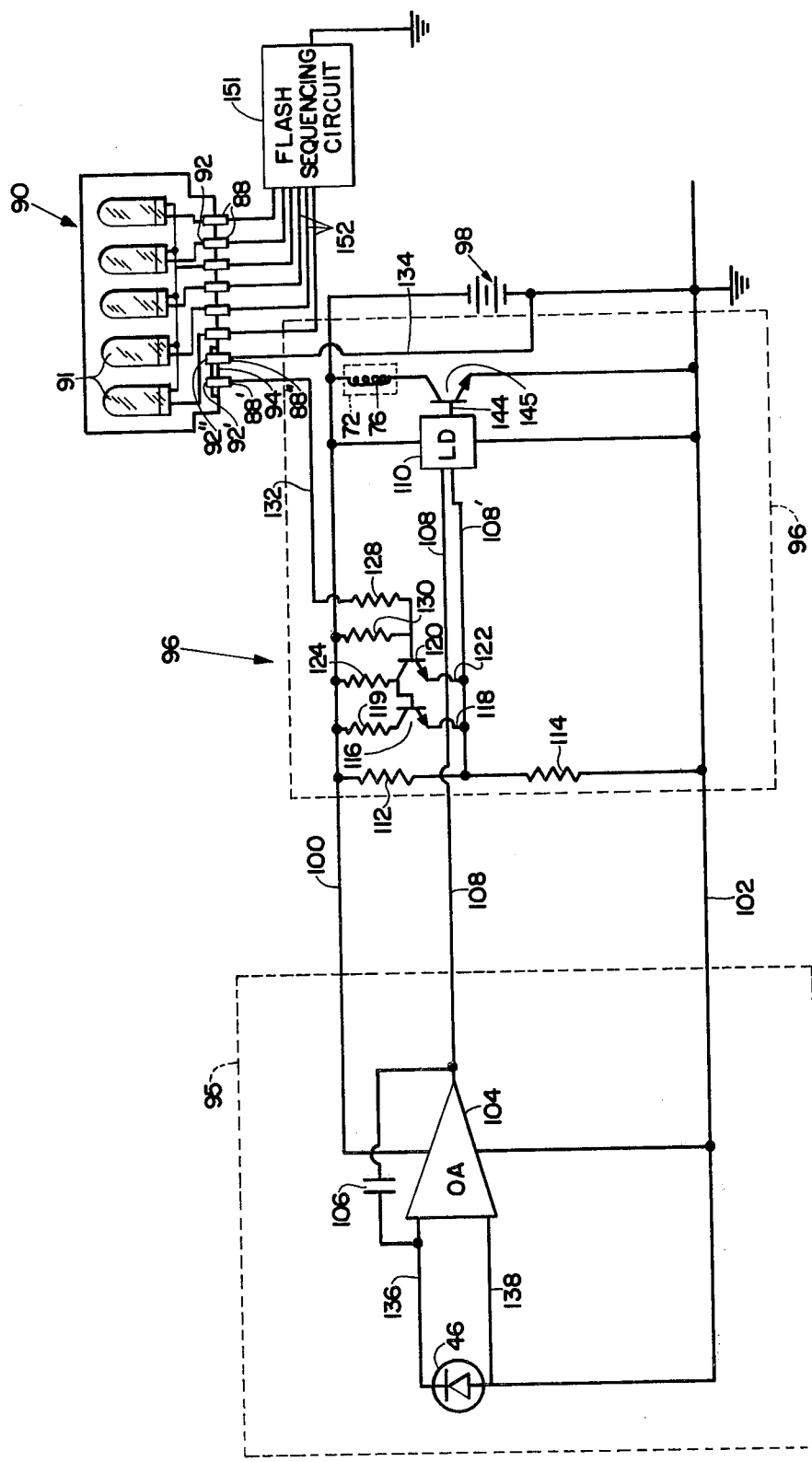
FIG. 3 is a schematic diagram of the exposure control circuits of this invention.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with light integrating and control circuitry as shown in FIG. 3 to terminate an exposure interval as a function of the amount of light received through the secondary effective aperture defined by the overlapping photocell sweep apertures 40 and 42.

Projecting from the baseblock casting 12 at a location spaced laterally apart of the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may also be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 is of conventional design having an internally disposed cylindrical plunger unit 74 which retracts inwardly into the body of the solenoid upon energization of a solenoid coil shown diagrammatically in FIG. 3 at 76. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 at a pin 82 while the stationary end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32 and 34 from moving towards their maximum aperture opening under the urging of spring 80. However, as should be readily understood, the exposure control system of this invention would be equally applicable to photographic systems where the blades 32 and 34 are spring biased in a normally closed position.

Continued energization of the solenoid 72 in order to maintain the shutter blade elements 32 and 34 in their closed positions may result in an undesirable drain in the camera apparatus power source which preferably is an electrical storage battery schematically shown in FIG. 3 at 98. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. patent, Ser. No. 554,777, entitled "Photographic Apparatus with Sequencing System" by B. K. Johnson, D. Van Allen and G. P. Whiteside, filed Mar. 3, 1975 in common assignment herewith.

The photographic camera apparatus 10 may be utilized in conjunction with a source of artificial illumination which preferably comprises a linear array of flash lamps as shown generally at 90. The linear flash array includes a plurality of individually spaced apart flash lamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photlflash Apparatus" by John Burgarella issued Sept. 11, 1973 and assigned in common herewith.

Under conditions of artificial illumination wherein the light has a relatively short duration, such as from the individual flash lamps 91 of the linear array 90, the anticipated light level at the camera will depend upon the known characteristics of the flash lamps 91 and upon the distance from the subject being photographed to the light source. When the flash array 90 is mounted on the receiving socket 86, there may be actuated a follow focus system whereby the maximum effective aperture to which the shutter blade elements 32 and 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 150) moves to appropriately displace a follow focus interceptor pin 146 about its locus of travel as shown by the phantom line 148. The follow focus interceptor pin 146 may be selectively actuated to intercept the edge of walking beam 54 in a well known manner as is fully described in U.S. patent application Ser. No. 554,777 entitled "Exposure Control System With Improved Follow Focus Capability For Photographic Apparatus," by George D. Whiteside, filed Feb. 28, 1975, and assigned in common herewith. Thus, as is readily apparent, the walking beam 54 may be intercepted by the follow focus interceptor pin 146 at various locations defining various maximum effective apertures which correspond to the distance from which the subject is spaced from the camera apparatus 10.

Turning again to FIG. 3, there is shown a schematic diagram for one embodiment of the exposure control circuitry of this invention comprising a scene light detecting and integrating circuit shown generally at 95, the output signal of which is directed to an exposure control circuit 96 which ultimately controls the actuation of solenoid coil 76. Circuit 95 includes the photoresponsive element 46 which may be a photovoltaic cell of the type generating an output signal in correspondence with the levels of scene light intensity incident thereon. The photoresponsive element 46 is orientated to evaluate the light levels of a scene coincident with the field of view of the lens system of the camera and operates in conjunction with the above described aperture scanning arrangement which alters the amount of scene light reaching the photoresponsive element 46 in synchronism and corresponding variation with the progressively changing aperture size. The photoresponsive element 46 is coupled with an amplifier stage 104 along input lines 136 and 138 wherein the amplifier 104 is of a type sometimes referred to in the art as an "operational amplifier" which may be of a differential variety preferably fabricated in practical miniaturized form. When considered ideally, the amplifier 104 has infinite gain and infinite input impedance and a zero output impedance. In addition, the operational amplifier 104 is energized to operate from the power supply 98 by means of an interconnecting supply line 100 and ground line 102.

By virtue of a feedback path comprising an integration capacitor 106 connected between the input line 136 and an output line 108 from the operational amplifier 104, the photoresponsive element 46 is permitted to operate into an apparent low-input impedance so as to function in a current mode, the current generated by the photoresponsive element 46 being limited substantially only by its own internal impedance. Thus, under such loading, the photoresponsive element 46 in conjunction with the operational amplifier 104 and capacitor 106 is capable of providing a desirable linear output corresponding to the time integration of scene light intensity incident to the photoresponsive element 46.

Any difference of potential supplied by the photoresponsive element 46 across input leads 136 and 138 causes a voltage to be produced at output line 108. The relatively low signal voltages at the input of amplifier 104 which are present with the relatively low signal current from the photoresponsive element 46 are acted upon by the correspondingly high gain characteristic of the amplifier. Thus, although the amplifier 104 has a very high input impedance, the photoresponsive element 46, when connected in the circuit described, experiences only a very low impedance. Therefore, the current output of the photoresponsive element 46 is directed into the feedback path.

Output line 108 from the light detecting and integrating circuit 95 connects to the input of a level detector circuit 110 which may be of any conventional design such as a Schmidt Trigger. A steady state reference input voltage level to the detector 110 is determined by biasing means comprising a first resistor 112 connected between supply line 100 and input line 108', together with a second resistor 114 connected between input line 108' and ground line 102. The output signal from the level detector 110 is connected to energize the solenoid coil 76 in a well known manner by way of line 144 and transistor 145, the emitter of which is grounded and the collector of which is connected to the supply line 100 by the solenoid winding 76. The reference voltage level at line 108' determine by the biasing resistors 112 and 114 may be altered by switching means comprising an NPN transistor 116 connected in parallel relation with respect to the resistor 112. The emitter of transistor 116 connects to the reference line 108' by way of line 118 while the collector connects to supply line 100 by way of a resistor 119. Transistor 116 is controlled by a second transistor 120, the collector of which connects to the base electrode of transistor 116. The emitter of transistor 120 also connects to the reference line 108' by way of a line 122 while the collector connects to supply line 100 by way of an interconnecting resistor 124. The base electrode of transistor 120 connects to the supply line 100 by way of an interconnecting resistor 130. It will also be appreciated that the base electrode to transistor 120 connects to a terminal element 88' in the flash array receiving socket 86 by way of a line 132 and resistor 128. Adjacent to terminal element 88' in the flash array receiving socket, there is provided a second terminal element 88" which connects to the ground line 102 by way of a interconnecting line 134. The output signal from the level detector 110 is connected by way of line 144 and transistor 145 to energize the solenoid coil 76.

Referring more particularly to the linear flash array 90 in FIG. 3, there may be seen two spaced apart terminal elements 92' and 92" which are electrically coupled by means of an interconnecting electrically conducting shorting element 94. The purpose to which the shorting element 94 is directed upon insertion of the flash array 90 within the receiving socket 86 will be made apparent from the following discussion. Other purposes to which like shorting elements have been used may be found in U.S. Pat. No. 3,757,643. The remaining terminals 88 may be seen to connect respectively by way of lines 152 to a flash sequencing circuit 154 of a type shown in U.S. Pat. No. 3,618,492.

The following operational sequence for the exposure control system of this invention is herein described in relation to a photographic camera of the nonsingle lens reflex type although the intended scope of the invention is by no means so limited and cameras of the well known reflex type as described in U.S. Pat. No. 3,672,281 entitled "Reflex Camera" by E. H. Land may be equally suitable for embodying the exposure control system of this invention.

Figure 4A:
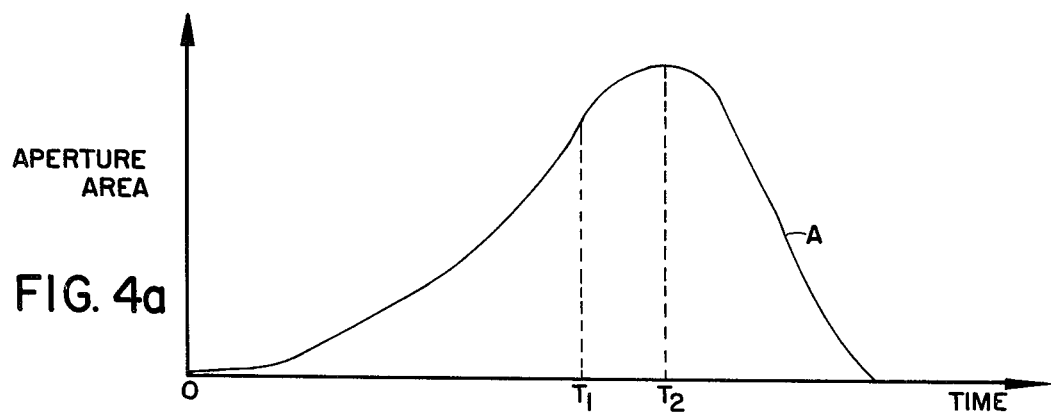
FIG. 4A is a graphical representation of aperture area versus time for the ambient mode of operation.

An ambient photographic exposure cycle may be commenced with the depression of the exposure cycle initiating button $S_1$ which operates to move the latch 84 out of engagement with the edge of the walking beam 54 so as to allow tension spring 80 to rotate the walking beam 54 in a clockwise direction as viewed in FIG. 2. In this manner, the shutter blade elements 32 and 34 are moved in directions which operate to progressively enlarge the effective aperture over the light entering exposure opening 16 as shown graphically by the curve A in FIG. 4A where the axis of ordinates is calibrated in units of area representing the actual effective area of the aperture defined by the overlapping primary apertures 36 and 38 and the axis of abscissas is calibrated in units of time. Thus the photographic exposure interval commences at time 0 as shown in the graph of FIG. 4A. As is readily apparent, rotation of walking beam 54 effects simultaneous linear and and angular displacement of the shutter blade elements 32 and 34 about pivot pin 48. Simultaneously, photocell sweep secondary apertures 40 and 42 define a corresponding progressively enlarging aperture opening over the photoresponsive element 46. The photoresponsive element 46 provides an output voltage response corresponding to the scene light intensity incident thereon, which voltage response is thereafter integrated by the operational amplifier 104 and feedback capacitor 106 to provide an output signal representative of the time integration of the scene light intensity incident to the photoresponsive element 46.

At the instant the photographic exposure cycle is initiated by the depression of the exposure cycle initiating button $S_1$, the steady state input reference voltage level to the level detector circuit 110 is biased by the resistors 112, 114 to coincide with the predetermined value required to trigger the level detector. Triggering the level detector 110 results in an abrupt change in the output current level at line 144 from a generally low value insufficient to energize the solenoid coil 76 to a substantially higher current level of sufficient value to energize the solenoid coil 76 and retract the plunger unit 74. During the photographic exposure cycle, the voltage level at line 108 gradually increases as a result of the time integration of the scene light incident to the photovoltaic cell 46, until it reaches the predetermined value required to trigger the level detector circuit 110 thereby abruptly changing the output response at line 144 to energize the solenoid coil 76. It should now be readily apparent that the difference between the steady state input reference voltage level to the level detector circuit 110 as established by the biasing resistors 112, 114 and the initial output voltage of the detecting and integrating circuit 95 at the commencement of the photographic interval is directly proportional to the change in the output signal level of the detecting and integrating circuit 95 during the exposure cycle. Thus, when an appropriate amount of light is received by the photoresponsive element 46, the level detector 110 is triggered to energize the solenoid coil 76 which operates to retract the plunger unit 74 so as to close the blade elements 32 and 34 and thereby terminate the exposure interval.

Figure 4B:
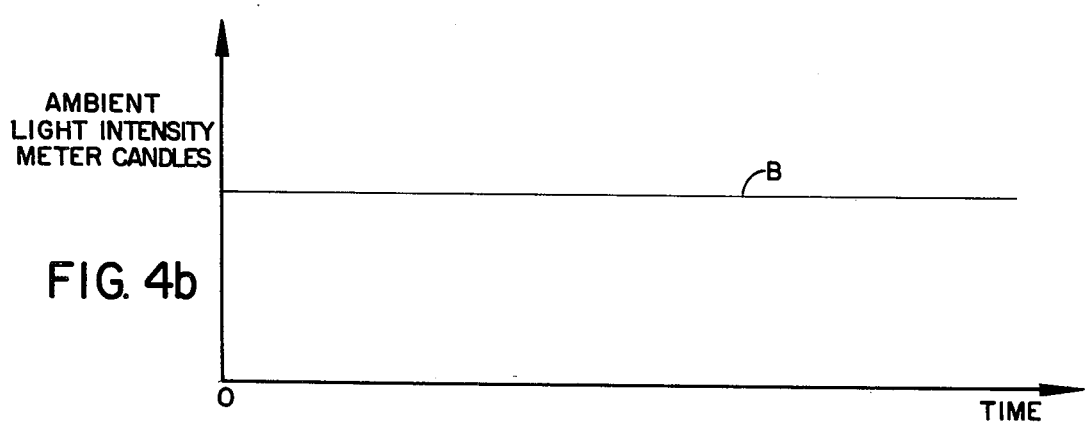
FIG. 4B is a graphical representation of the ambient scene light intensity versus time.

Referring again to the curve A of FIG. 4A, it may be seen that the level detector 110 is triggered after an appropriate amount of light is received to energize the solenoid coil 76 at time $T_1$. However, as a result of the forward momentum of the shutter blade elements 32 and 34 as well as the walking beam 54, there elapses a period of time subsequent to $T_1$ before the solenoid 72 exerts sufficient force to stop the shutter blade elements 32 and 34 at time $T_2$. Once the opening momentum of the shutter blade elements 32 and 34 is overcome to stop the blades, there is a further time period after $T_2$ during which the shutter blade elements are returned to their closed position as shown in FIG. 4A. Where the ambient light intensity remains substantially constant as shown by curve B in FIG. 4B, then the actual exposure, as shown by curve C in FIG. 4C, where the axis or ordinates is calibrated in meter-candles and the axis of abscissas is calibrated in units of time, incurs a considerable error as indicated by the cross-hatched area enveloped by the curve C subsequent to time $T_1$. As is readily apparent, the exposure error is due first to the overshoot of the shutter blade elements 32 and 34 subsequent to time $T_1$ before their opening momentum can be overcome at time $T_2$ and secondly to the time required for the shutter blade elements to return to their closed position after time $T_2$. This exposure error is readily predictable and may be overcome in a well known manner by configuring the photocell sweep secondary apertures 40 and 42 to progressively open ahead of the primary apertures 36 and 38 so as to prematurely trigger the control circuit to energize the solenoid prior to the time at which the film is fully exposed. Thus, the additional exposure resulting from the shutter blade overshoot and closing time may be anticipated by prematurely triggering the shutter blades to close prior to the time required for full exposure of the film. As is readily apparent, once the shutter blade elements 32 and 34 are returned to their closed position, the solenoid 72 must remain energized until such time as the latch 84 is moved into lateral engagement with the edge of the walking beam 54.

Under conditions where the ambient light is insufficient to provide an adequate film exposure, the linear flash array 90 may be inserted into the flash array receiving socket 86 in a manner causing respective electrical contact between the terminal pads 92 and 88. Insertion of the linear flash array 90 within the flash array receiving socket 86 may also operate to actuate the follow focus mechanism 150 so as to move the interceptor pin 146 into the walking beam 54 locus of travel. As previously discussed, rotation of the focus bezel 22 to focus the objective lens 18 also operates to move the interceptor pin 146 along the phantom line 148. Thus, the maximum effective aperture to which the shutter blade elements 32, 34 may be progressively opened is limited by the point of interception of the pin 146 with the edge of the walking beam 54.

Referring again to FIG. 3, it can be seen that insertion of the linear flash array 90 into the socket 86 additionally operates to bring the terminal elements 92', 92″ into respective electrical contact with the terminal elements 88′, 88″ from the control circuit 96. The remainder of the terminal elements 92 are brought into respective electrical contact with the terminal elements 88 so as to electrically couple the flash lamps 91 into the flash sequencing circuit 154 via the lines 152. The electrically conductive shorting element 94 thus operates to connect the base electrode of transistor 120 to ground by way of the interconnecting lines 132, 134 and resistor 128. Transistor 120 is therefor turned off while transistor 116 is turned on as a result of the increased base current thereto. With transistor 116 turned on, resistor element 119 is connected in parallel relation with respect to the biasing resistor 112 so as to further increase the reference voltage level at line 108′ above the predetermined voltage level previously required to trigger the level detector 110.

The flash cycle of operation is also commenced with the depression of the button $S_1$ which in turn operates to move the latch 84 out of engagement with the edge of walking beam 54, thus permitting the tension spring 80 to rotate the walking beam 54 in a clockwise direction to move the shutter blade elements 32 and 34 in directions which operate to progressively enlarge the effective aperture over the light entering exposure opening 16. The photocell sweep secondary apertures 40, 42 are progressively enlarged in correspondence with the primary apertures 36, 38 so as to allow scene light to impinge upon the photoresponsive element 46. The photoresponsive element 46 then provides an output voltage response corresponding to the scene light intensity incident thereon, which voltage response is thereafter integrated by the operational amplifier 104 and feedback capacitor 106 to provide an output signal representative of the time integration of the scene light intensity.

As is now readily apparent, the change in the output signal at line 108 resulting from the light integration of circuit 95 subsequent to the commencement of a flash mode exposure cycle must be greater than that required during the ambient mode in order to reach the new predetermined reference value required to trigger the level detector 110 into energizing the solenoid coil 76. This results from the increase in the steady state reference voltage at line 108′ as a consequence of resistor element 119 being connected in parallel relation with respect to the biasing resistor 112 during the flash mode of operation. In this manner, the actual exposure of the film prior to the instant at which the command signal from the light detector 110 energizes the solenoid coil 76 is substantially increased in comparison to the ambient mode of operation.

Increasing the film exposure in this manner prior to the command signal to return the shutter blade elements to their closed positions has been found to provide a substantially improved photographic exposure under artificial lighting conditions, and although the reasons may be varied and not entirely understood, it is believed that the improvement results primarily for reasons to be subsequently described here.

Figure 5A:
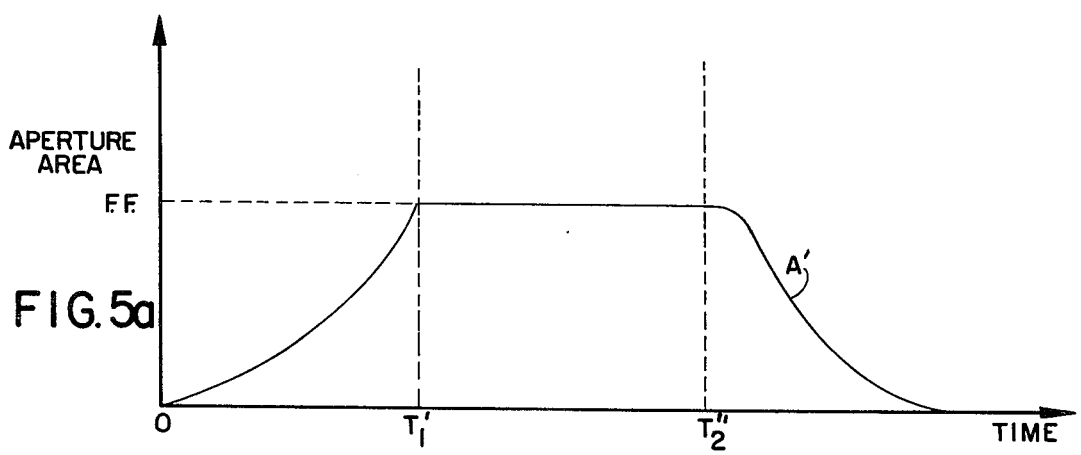
FIG. 5A is a graphical representation of aperture area versus time for the artificial illumination mode of operation.

Referring now to FIG. 5A, there is shown a graphical representation at A′ of the progressively changing effective aperture area during the flash mode of operation where the axis of ordinates is calibrated in units of area while the axis of abscissas is calibrated in units of time. The walking beam 54 thus rotates in a clockwise direction into interception with the follow focus interceptor pin 146 so as to reach its maximum effective aperture as determined by the follow focus system at time $T_1'$. The shutter blade elements 32 and 34 thereafter remain at rest until the light integrating circuit 95 provides an output signal sufficient to trigger the level detector 110 into energizing the solenoid coil 76. Whereas the forward momentum of the shutter blade elements 32 and 34 as well as the walking beam 54 is overcome by the interceptor pin 146, it will be appreciated that the shutter blade elements immediately start to return to the closed position when the solenoid coil 76 is energized at time $T_2''$. Thus, the shutter blade elements 32 and 34 do not overshoot their maximum effective aperture after the level detector 110 is triggered as they do in FIG. 4A for ambient mode operation.

Figure 5B:
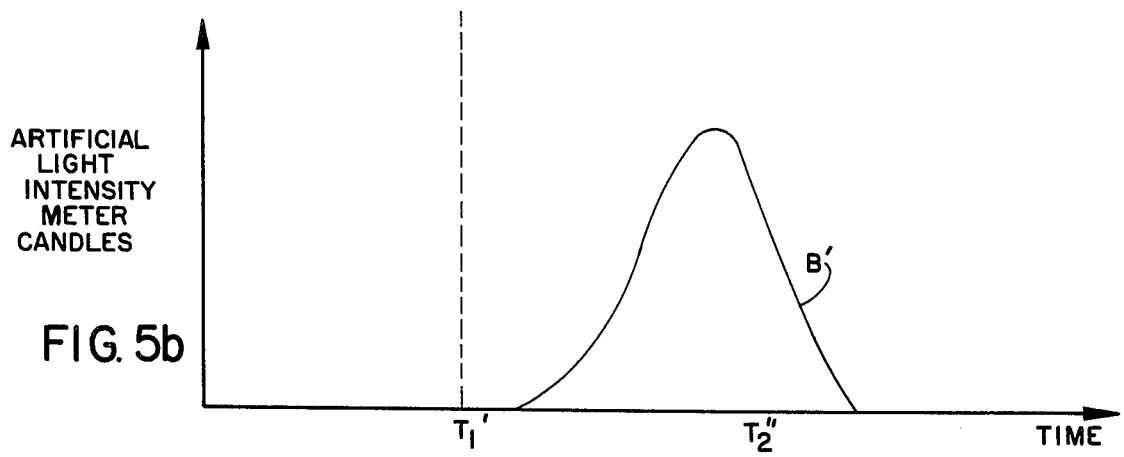
FIG. 5B is a graphical representation of the artificial scene light intensity versus time.

Referring now to FIG. 5B, there is shown a graphical representation at B′ of the variation in the intensity of artificial light with respect to time on a scene illuminated by a typical flash lamp 91 of the linear array 90. The flash lamp 91 may be triggered to illuminate at some predetermined time delay subsequent to the commencement of a photographic exposure cycle. As will be readily understood, the time delay is generally sufficient to permit the shutter blade elements 32 and 34 to reach their maximum effective aperture defining position as determined by the position of the interceptor pin 146 of the follow focus system 150. The command signal at the time $T_2''$ to energize the solenoid 72 and close shutter blade elements 32, 34 will generally occur on the decreasing slope of the light intensity curve B′.

Figure 4C:
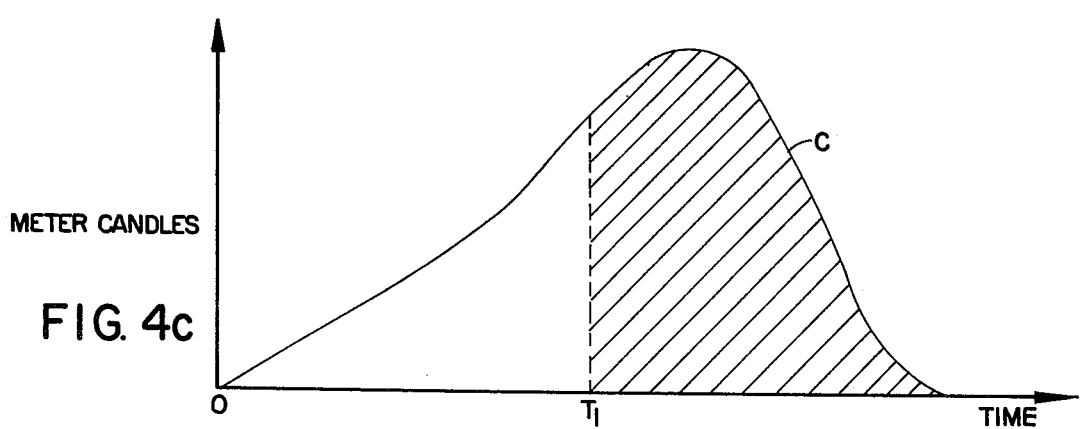
FIG. 4C is a graphical representation of the light intensity incident to the film plane versus time for the ambient mode exposure interval of FIG. 4A.
Figure 5C:
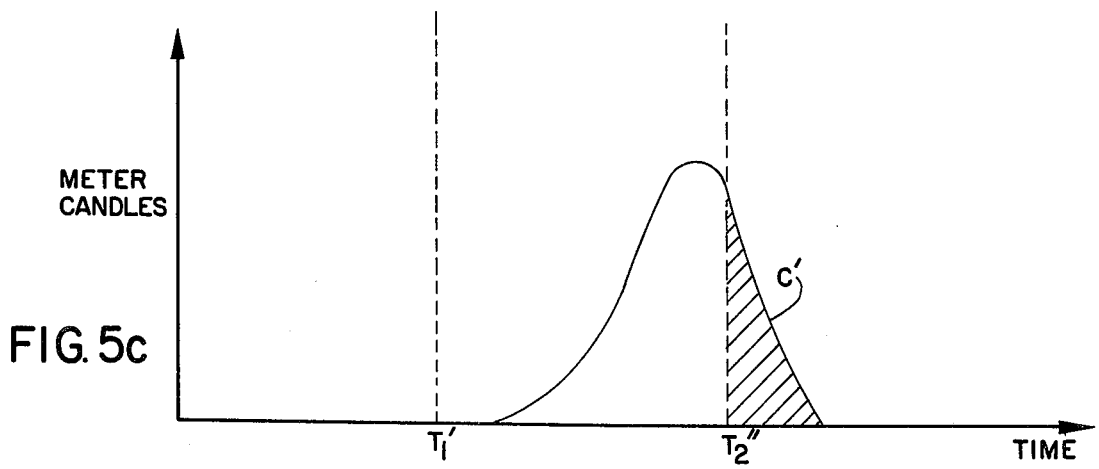
FIG. 5C is a graphical representation of the light intensity incident to the film plane versus time for the artificial illumination mode exposure interval of FIG. 5A.

Referring now to FIG. 5C, there is shown at C′, the graphical representation of the actual film exposure where the axis or ordinates is calibrated in meter-candles and the axis of abscissas is calibrated in units of time. As is readily apparent, the area enveloped by the exposure curve C′ subsequent to the command signal from the level detector 110 energizing the solenoid coil 76 at time $T_2''$ represents a substantially smaller portion of the entire area enveloped by the exposure curve C′ when compared with the exposure curve C for the ambient mode of operation as shown in FIG. 4C.

Thus, the built-in anticipation of the photocell sweep secondary apertures 40 and 42 would result in a premature termination of the flash mode exposure cycle. As is now readily apparent, this results partly from the fact that the shutter blade elements 32 and 34 are generally at rest when the command signal is received at time $T_2''$ to return the shutter blade elements to their closed position. The shutter blade elements thus do not overshoot their maximum effective aperture at time $T_2''$ which has the effect of substantially decreasing the overall exposure subsequent to time $T_2''$ when compared with the ambient mode of operation. In addition as is also now readily apparent, the command signal at time $T_2''$ generally occurs on the decreasing slope of the artificial light intensity curve B′ thereby accelerating the decrease in the actual film exposure during the time required to close the shutter blade elements. By comparison, ambient light intensity remains substantially constant during the shutter blade closing time and thus will operate to increase the actual film exposure to a greater extent than the decreasing artificial illumination.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. A photographic camera for alternate use in ambient and artificial scene lighted conditions comprising:
   a housing;
   means within said housing for receiving a source of electrical energy;
   means within said housing for defining a film exposure plane;
   a pair of aperture shutter blades;
   means for mounting said blades for selective simultaneous displacement from an initial closed arrangement wherein said blades preclude scene light from impinging on said exposure plane to an open arrangement wherein said blades permit scene light to impinge on said exposure plane and then to a final closed arrangement wherein said blades again preclude scene light from impinging on said exposure plane, such a displacement of said blades serving to define an exposure interval during which scene light impinges on said exposure plane through changing aperture sizes defined by said blades;
   scene light detecting means responsive to scene light for providing an output signal in correspondence to detected scene light;
   means for actuating said mounting means to initiate displacement of said blades from their said initial closed arrangement towards their said open arrangement thereby commencing said exposure interval and for subsequently actuating said mounting means in correspondence with said output signal to initiate the displacement of said blades into their said final closed arrangement; and
   means inoperative during exposure operations involving only ambient scene lighted conditions for selectively increasing the correspondence relationship between said output signal and scene light detected by said detecting means to facilitate exposure operations involving artificial scene lighted conditions, the rendering of said correspondence increasing means operative resulting in an increase of detected scene light in order for said detecting means to provide the same output signal under artificial scene lighted conditions as otherwise provided by said detecting means under ambient scene lighted conditions.

2. The camera of claim 1 wherein:
   said scene light detecting means include means for detecting and integrating scene light incident to the camera subsequent to the commencement of the exposure interval in order to provide an output signal condition corresponding to said integrated scene light, together with signal detecting means responsive to a select change in the value of the output signal condition of said integrating means after the commencement of the exposure interval for providing said output signal to initiate the displacement of said blades into their said final closed arrangement; and
   said means for selectively increasing the correspondence relationship includes means responsive to a select event for altering the value of said select change required in the output signal condition of said integrating means for said signal detecting means to provide said output signal to initiate the displacement of said blades into their said final closed arrangement.

3. The photographic camera of claim 2 wherein said signal detecting means include a level detector having means by which an input signal may be applied thereto and said output signal derived therefrom wherein said output signal from said level detector abruptly occurs in response to the input signal to the level detector reaching a predetermined value and additionally including biasing means for establishing an input reference signal level to said level detector coinciding with said predetermined value wherein the difference between the input reference signal level to said level detector established by said biasing means and the output signal condition of said integrating means at the commencement of a photographic exposure interval is directly proportional to said select change in the output signal condition of said integrating means.

4. The photographic camera of claim 3 wherein said means for altering the value of said select change required in the output signal condition of said integrating means includes means for changing the input reference signal level to said level detector established by said biasing means.

5. The photographic camera of claim 4 including means for receiving a source of artificial illumination for releasable connection with respect to the camera housing and wherein said means for changing the reference signal level to said level detector as established by said biasing means includes switching means connected in parallel relation with respect to said biasing means, said switching means also being connected to at least a pair of spaced apart terminal elements cooperatively associated with said means for receiving the source of artificial illumination, wherein said terminal elements are also releasably contactable to a corresponding pair of electrically interconnected terminal elements from the source of artificial illumination whereupon said switching means operates to change the input signal level to said level detector in response to the select event of connecting the source of artificial illumination to the camera housing so that the electrically interconnected terminal elements from the source of artificial illumination electrically contact said terminal elements from said switching means.

6. The photographic camera of claim 4 wherein said actuating means includes an electromagnetic device for moving said mounting means from said open arrangement wherein said blades permit scene light to impinge on said exposure plane to said final closed arrangement wherein said blades again preclude scene light from impinging on said exposure plane, said electromagnetic device including a coil and plunger wherein said plunger is actuated to move said mounting means toward said final closed arrangement upon energization of said coil in response to said output signal from the level detector abruptly occurring as a result of the input signal to the level detector reaching said predetermined value.

7. The photographic camera of claim 4 wherein said scene light detecting and integrating means include means for detecting variations in incident scene light in correspondence with the variations in scene light admitted by the changing aperture sizes as defined by said blades subsequent to the commencement of the exposure interval.

8. The photographic camera of claim 4 including follow focus means for limiting the maximum sized aperture to which the blades may increase as a function of objective lens focusing when the photographic apparatus is utilized in conjunction with a source of artificial illumination.

9. Photographic camera for alternate use in ambient and artificial scene lighted conditions comprising:

a housing;

means within said housing for receiving a source of electrical energy;

means within said housing for defining a film exposure plane;

a blade assembly;

means for mounting said blade assembly for selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blades serving to define an exposure interval;

scene light detecting and integrating means responsive to scene light for providing an output signal in correspondence to detected scene light; and means for actuating said mounting means to initiate displacement of said blade assembly from its said initial closed arrangement towards its said open arrangement thereby commencing said exposure interval and for subsequently actuating said mounting means in correspondence with said output signal to initiate the displacement of said blade assembly into its said final closed arrangement, said last stated means including means inoperative during exposure operations involving only ambient scene lighted conditions for selectively changing the correspondence between said output signal and scene light detected by said detecting and integrating means to facilitate exposure operations involving artificial scene lighted conditions.

10. The photographic camera of claim 9 wherein said means for selectively changing the correspondence between said output signal and scene light detected by said detecting and integrating means includes an electrical circuit energizable by the source of electrical energy as well as circuit means responsive to electrically coupling a source of artificial illumination to said electrical circuit for automatically changing the correspondence between said output signal and scene light detected by said detecting means.

11. The camera of claim 9 wherein:

said scene light integrating and detecting means operate to integrate scene light incident to the camera subsequent to the commencement of the exposure interval in order to provide a continuously varying output signal condition corresponding to said integrated scene light, said output signal being indicative of a select change in the value of the output signal condition of said integrating means after the commencement of the exposure interval;

said actuating means include signal detecting means responsive to said select change in the value of the output signal condition of said integrating means after the commencement of the exposure interval for initiating the actuation of said mounting means to effect the displacement of said blades into their said final closed arrangement; and said means for selectively changing the correspondence includes means responsive to a select event for altering the value of said select change required in the output signal condition of said integrating means for said signal detecting means to initiate the displacement of said blades into their said final closed arrangement.

12. The photographic camera of claim 11 wherein said signal detecting means include a level detector having means by which an input signal may be applied thereto and an output signal derived therefrom wherein the output signal from said level detector abruptly changes in response to the input signal to the level detector reaching a predetermined value and additionally including biasing means for establishing an input reference signal level to said level detector coincident with said predetermined value wherein the difference between the input reference signal level to said level detector established by said biasing means and the output signal condition of said integrating means at the commencement of an exposure interval is directly proportional to said select change in the output signal condition of said integrating means.

13. The photographic camera of claim 12 wherein said means for altering the value of said select change required in the output signal condition of said integrating means includes means for changing the input reference signal level to said level detector established by said biasing means.

14. The photographic camera of claim 13 including means for receiving a source of artificial illumination for releasable connection with respect to the camera housing and wherein said means for changing the input signal level to said level detector as established by said biasing means includes switching means connected in parallel relation with respect to said biasing means, said switching means also being connected to at least a pair of spaced apart terminal elements cooperatively associated with said means for receiving the source of artificial illumination, wherein said terminal elements are also releasably contactable to a corresponding pair of electrically interconnected terminal elements from the source of artificial illumination whereupon said switching means operates to change the input signal level to said level detector in response to the select event of connecting the source of artificial illumination to the camera housing so that the electrically interconnected terminal elements from the source of artificial illumination electrically contact said terminal elements from said switching means.

15. The photographic camera of claim 13 wherein said actuating means additionally includes an electromagnetic device for moving said mounting means from said open arrangement wherein said blades permit scene light to impinge on said exposure plane to said final closed arrangement wherein said blades again preclude scene light from impinging on said exposure plane, said electromagnetic device including a coil and plunger wherein said plunger is actuated to move said mounting means toward said final closed arrangement upon energization of said coil in response to said output signal from the level detector abruptly changing as a result of the input signal to the level detector reaching said predetermined value.

16. The photographic camera of claim 13 wherein said scene light detecting and integrating means include means for detecting variations in incident scene light in correspondence with the variations in scene light admitted by the changing aperture sizes as defined by said blades subsequent to the commencement of the exposure interval.

17. The photographic camera of claim 13 including follow focus means for limiting the maximum sized aperture to which the blades may increase as a function of objective lens focusing when the photographic apparatus is utilized in conjunction with a source of artificial illumination.

* * * * *